(12) United States Patent
Baikalov et al.

(10) Patent No.: US 11,468,371 B2
(45) Date of Patent: Oct. 11, 2022

(54) PREDICTION EXPLAINER FOR ENSEMBLE LEARNING

(71) Applicant: Securonix, Inc., Los Angeles, CA (US)

(72) Inventors: Igor A. Baikalov, Thousand Oaks, CA (US); Joseph Samuel Miller, Dallas, TX (US); Tanuj Gulati, Carrollton, TX (US); Rakesh Palacherla, Dallas, TX (US)

(73) Assignee: Securonix, Inc., LosAngeles, CA (US)

( * ) Notice: Subject to any disclaimer, the term of this patent is extended or adjusted under 35 U.S.C. 154(b) by 1055 days.

(21) Appl. No.: 16/139,005

(22) Filed: Sep. 22, 2018

(65) Prior Publication Data

US 2020/0097858 A1  Mar. 26, 2020

(51) Int. Cl.
*G06K 9/00* (2022.01)
*G06N 20/20* (2019.01)
*G06K 9/62* (2022.01)

(52) U.S. Cl.
CPC .............. *G06N 20/20* (2019.01); *G06K 9/623* (2013.01); *G06K 9/6215* (2013.01); *G06K 9/6257* (2013.01); *G06K 9/6282* (2013.01)

(58) Field of Classification Search
CPC ........ G06N 20/00; G06N 20/20; G06N 5/003; G06N 7/005; G06N 20/10; G06N 3/0454; G06N 3/08; G06N 3/088; G06N 3/084; G06N 5/04; G06N 3/049; G06N 3/00; G06N 3/008; G06N 3/0472; G06N 5/025; G06N 5/045; G06N 3/0481; G06N 3/0445; G06N 3/02; G16H 50/20; G16H 50/70; G16H 50/30; G16H 10/60
See application file for complete search history.

(56) References Cited

U.S. PATENT DOCUMENTS

| | | | | |
|---|---|---|---|---|
| 2016/0096272 | A1* | 4/2016 | Smith ................. | G05D 1/0088 700/255 |
| 2016/0192889 | A1* | 7/2016 | Koutsouleris ........ | A61B 5/4088 600/410 |
| 2016/0260211 | A1* | 9/2016 | Gillies ..................... | A61B 6/50 |

* cited by examiner

*Primary Examiner* — Alex Kok S Liew
(74) *Attorney, Agent, or Firm* — Barry N. Young

(57) ABSTRACT

A method of explaining the reasons for a prediction made by a machine learning ensemble prediction process as to the probability of an outcome for a target observation following training on a plurality of training observations determines the similarity between the target observation and each training observation of a set of said training observations; selects a fraction of the training observations that are most similar to said target observation; ranks the training observations by similarity of each training observation to the target observation; and determines the significance of the features of the ranked training observations to the prediction based upon the increase in variance in a local prediction model when a feature is removed from the local model.

20 Claims, 8 Drawing Sheets

PREDICTION EXPLAINER FOR ENSEMBLE LEARNING

BACKGROUND

This application relates generally to methods and systems employing machine learning and artificial intelligence, and more particularly to methods and systems that afford insight into the factors that were important to the results produced by machine learning methods and systems.

Machine learning is a subfield of artificial intelligence that allows a computer system to learn from data automatically without being explicitly programmed. A main application is to make predictions based on the patterns and relationships captured by the machine learning models, particularly for large multi-variable data sets. The predictive power of machine learning models continues to evolve and improve with the development of new algorithms and with the significant increases being made in available computing power, speed and capacity which enable large volumes of complex data to be processed easily and quickly.

The biggest challenges in utilizing the predictive capacity of machine learning are a lack of insight into the reasons behind its predictions, and the need to identify and to understand which of a plurality of factors are significant to a prediction. Understanding why a prediction was made is essential both to validate the predictive model as well as to permit appropriate action taken on the prediction. These challenges increase with the complexity of the machine learning model, the complexity of underlying data, and the prediction accuracy desired. For a small dataset with relatively straightforward relationships, a simple decision tree might be sufficient as a predictive model. However, with real world problems, there might be hundreds or thousands of parameters and millions of rows of data generated by a complex underlying process that must be considered in reaching a prediction. Machine learning algorithms that are able to analyze such problems and make predictions are considerably more complex and are not nearly as transparent as a simple decision tree. Rather, they are analogous to black boxes that produce predictions based on a variety of different inputs, but do not provide any indication of why a specific prediction was made or the factors that were significant to the prediction.

This lack of transparency hinders the ability to use machine learning in many critical areas, especially where the outcome of the decision process is mediated by human analysts where the reasons for a decision must be understood to decide how to respond to the decision and how to improve existing systems and methods for future operations. Consider, for example, a cybersecurity analyst who receives an alert based upon a prediction by a machine learning process that a particular network segment being monitored has a high probability of being a source of malicious traffic. The analyst might be hesitant to block network traffic from this segment without further investigation because blocking it can impact business activities or otherwise have severe consequences. Without visibility into the reasoning behind the algorithm's decision, further investigation may require a time-consuming manual review of massive amounts of data that the algorithm processed at computer speeds, meanwhile leaving the organization exposed to the detected threat.

This is a sufficiently widespread and difficult problem that the Defense Advanced Research Projects Agency ("DARPA") announced funding opportunities for research proposals [*Broad Agency Announcement; Explainable Artificial Intelligence (XAI); DARPA-BAA-*16-53; Aug. 10, 2016] to create a suite of new machine learning techniques that produce explainable models that, when combined with effective explanation techniques, enable users to understand, appropriately trust, and effectively manage emerging artificial intelligence systems. Although there has been some progress in developing a prediction explainer for natural language processing (NLP) applications, one published method [see Ribero, Marco Tulia, et. al., "*Why Should I Trust You?" Explaining the Predictions of any Classifier, Proc. NAACL-HLT* 2016 (Demonstrations), pp. 97-101, San Diego, Calif., Jun. 12-17, 2016] tends to pick factors for the explanation that are often irrelevant to the nature of prediction, and manual editing of the model ("feature cleaning") is suggested by the authors to remove irrelevant factors. The paper also describes a general approach for generating synthetic data from a desired distribution, which is impractical. Thus, this published method is hardly an acceptable approach for many applications, such as cybersecurity analysis, to identify and respond to malicious emails and threats.

There is a need for efficient, near real-time machine learning approaches that afford a concise understanding of the important factors that govern a specific prediction to afford an analyst the information needed to make a fast informed decision about the prediction. The invention addresses these and other known problems of machine learning predictive processes.

DESCRIPTION OF PREFERRED EMBODIMENTS

As will be described, the invention affords an efficient, near real-time method and system of identifying the relative importance of a plurality of factors analyzed by a machine learning prediction algorithm to make a prediction were the most important factors to the algorithm's specific prediction, in order to provide information needed to enable fast informed action. The invention is especially applicable to ensemble machine learning algorithms where multiple models or hypotheses are combined to obtain better predictive performance than could be obtained using constituent learning algorithms alone, and it will be described in the context of such ensemble processes using as a preferred embodiment a type of Random Forest ensemble process. Additionally, a particular utility of the invention is in cybersecurity applications for analyzing and classifying network communications such as emails in real time to detect and block suspicious, malicious or otherwise harmful traffic, and the invention will be described in this context also. However, as will become apparent, these contexts are illustrative of only some utilities of the invention, and it may be employed with other types of ensemble processes and algorithms and for other purposes.

In one aspect, the invention affords an explainer process and system that explains a prediction or an outcome generated by an ensemble machine learning model by attempting to fit a simple, interpretable model, such as a single decision tree, into a region that is local to a target observation of interest. Then the features are ranked by their importance (significance) to the predicted results for a target observation of interest, and the features with low importance are removed from the model. The feature ranking indicates the relative importance of each feature to the prediction that was made, and helps explain the reasons for that prediction. Understanding the reasons for the prediction provides information that may be used to determine the most appropriate way to utilize the prediction in the context of the subject of the prediction. For instance in the cybersecurity context where an ensemble process predicted the probability that a particular target email was suspicious or malicious, an explainer process in accordance with the invention identifies the features of the target email that were most responsible for that prediction. This information allows particular actions to be taken such as, for example, automatically blocking the email and/or providing information for further analysis and action.

Figure 1:
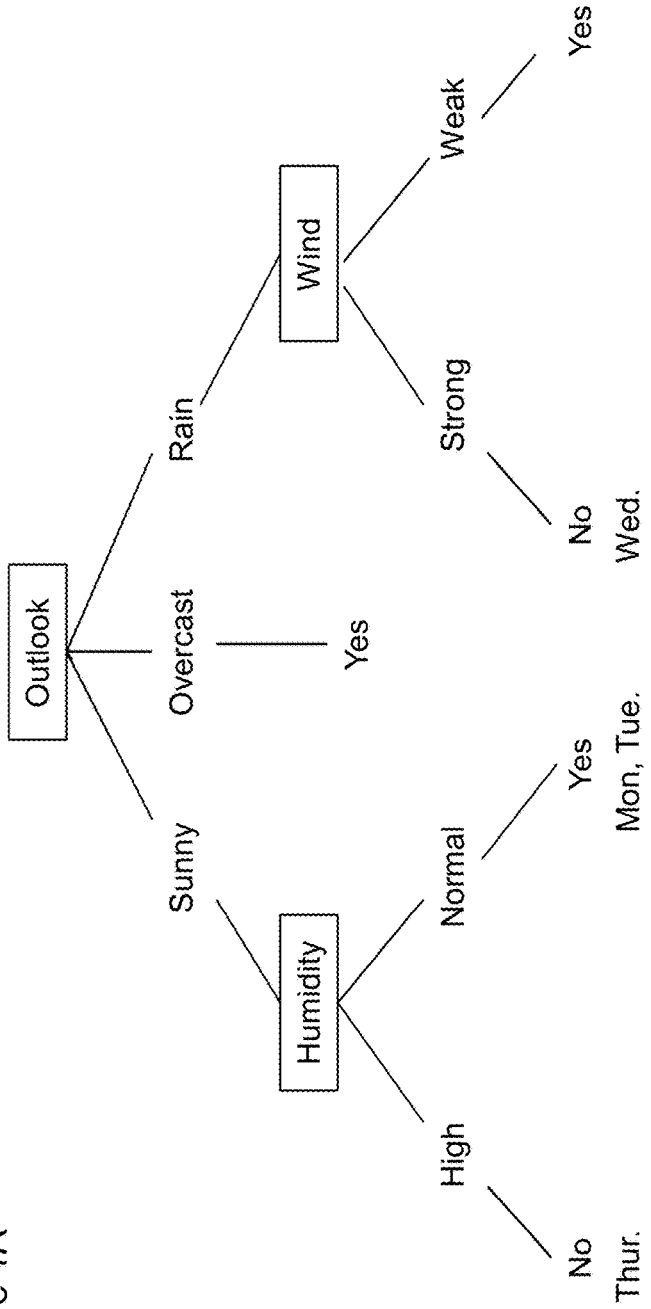
FIGS. 1 A and 1B illustrate an example of a simple decision tree process that is useful to a better understanding of the invention, FIG. 1A illustrating a table of weather forecasts based upon a plurality of weather-related features having particular values for four different days, and FIG. 1B illustrating a mapping of the features onto a simple decision tree.

Prior to describing the invention, a simplified example of a decision tree process will be described in connection with FIGS. 1A and 1B as this will facilitate a better understanding of the invention. FIG. 1A illustrates an example of a table of weather forecasts for four days (Monday ("Mon") to Thursday ("Thu")) having as features "Outlook", "Humidity" and "Wind". Each feature has a set of possible values. For instance, "Outlook" may have a value of either "Sunny", "Overcast" or "Rain"; "Humidity" may have a value of "Normal" or "High"; and "Wind" may have a value of either "Weak" or "Strong". The table gives the values of the weather features for each of the four days. Assume that the question is whether to play tennis based upon weather outlook ("yes" or "no"). FIG. 1B illustrates a mapping of the features in the table onto a decision tree where each feature is a node of the decision tree. For a small dataset such as in FIG. 1 A with relatively straightforward relationships, a simple decision tree as in FIG. 1B may be sufficient to reach an outcome (decision). However, in many real world situations, such as a cybersecurity process to detect malicious emails, where there may be hundreds of parameters and vast amounts of data, a simple decision tree is not practical as an analysis and prediction tool. Machine learning ensemble prediction algorithms utilizing a plurality of prediction models, however, are able to process large amounts of complex data, discover relationships and predict outcomes by combining the predictions made by the plurality of prediction models.

Figure 2:
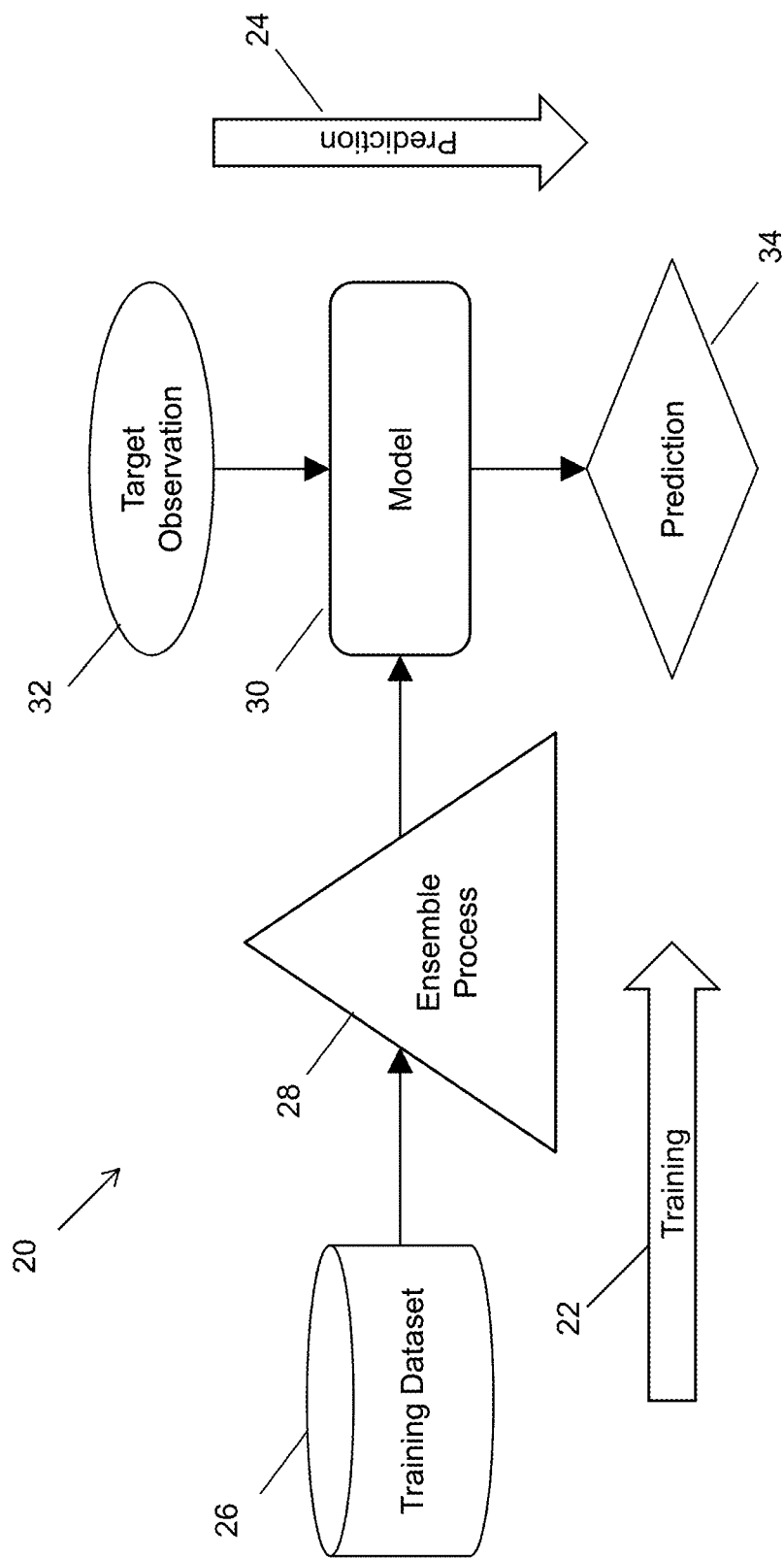
FIG. 2 is functional block diagram giving an overview of a prediction process and system with which the invention may be employed.

FIG. 2 is a functional block diagram giving an overview of a machine learning prediction process 20 with which the invention may be employed. The machine learning process "learns" from data automatically without being explicitly programmed to make predictions (classifications) based upon the patterns and relationships captured by machine learning models. The process may run on a computer system (not shown) comprising one or more processors having non-transitory physical memory storing executable instructions that control the processor(s) to perform the intended operations as described herein, and may have storage, I/O and other functionality that is typical of a computer system. The computer system may comprise a stand-alone processing system, or a computer system in a centralized data center or network hub, or it may comprise distributed processing systems that are part of a distributed processing network.

As stated above, and as will be described more fully below, prediction process (and system) 20 may comprise a machine learning ensemble prediction process and system that "learns" from data automatically without being explicitly programmed to make predictions based upon the patterns and relationships captured by the plurality of machine learning models of the ensemble. As shown in FIG. 2, the prediction process 20 has a training portion 22 and a prediction portion 24. In a training phase, the process may be supplied with subsets of training data (training observations) from a training dataset 26 comprising previously analyzed data similar to and representative of the type of target data to be analyzed and processed for which a prediction or outcome is desired. The training dataset 26 preferably comprises a large multiplicity of training observations. Subsets of the training data may be processed by an ensemble machine learning process 28, which in a preferred embodiment may be a type of Random Forest ensemble prediction process, that produces using the patterns and relationships discovered in the training observations, a prediction model 30 which is used to predict the probable result of a target observation 32 for which a prediction is desired. The target observation is analyzed using the prediction model to produce a prediction 34 of the probability of a particular outcome or characteristic of the target observation.

In a preferred embodiment, the process and system 20 may be used by an enterprise in a cybersecurity application to detect and identify emails which may be suspicious or malicious and may pose a threat. The training dataset from which the process and system "learns" patterns and relationships may comprise a large number of previous emails (training observations) of the enterprise, some of which were found to be suspicious or malicious and some of which were not. Each email of the training dataset may be characterized by a plurality of different descriptive features or attributes each having a feature value, as will be described, as well as the results of a previous determination that the email either was or was not malicious, which is the usual desired outcome of interest in a cybersecurity analysis. The ensemble prediction process 28 recursively processes randomly selected subsets of the email training observations, each subset having different feature values, to produce the prediction model 30 which is used to analyze a particular target observation (email) 32 and predict the probability that the target email is malicious. The features or attributes that characterize the emails may have a categorical value ("yes"-"no"; "true"-"false"; "1"-"0", etc.) or a continuous (numerical) value depending upon the feature. Of the multitude of possible features or attributes that may characterize the type of data being analyzed (e.g., emails in an enterprise environment), the features or attributes included in the dataset for training purposes may be pre-selected, as by using well known feature engineering techniques, to be those most likely to be applicable and relevant to the characteristic being addressed, as will be illustrated below.

As stated, a preferred machine learning predictive process is based upon a Random Forest algorithm. It is an ensemble machine learning algorithm that is useful for classification, regression and other tasks. It operates by constructing a multitude of uncorrelated decision trees during training to produce a prediction model to predict a result for a target observation by averaging the classifications or predictions of the individual decision trees to produce a final overall prediction. Random Forest is fast, easy to use, resistant to over-fitting and able to capture sophisticated relationships in large complex datasets having many different variables. As will be appreciated, however, a Random Forest algorithm is only one type of a number of different prediction algorithms that may be used, and the invention may be used with other analysis and prediction approaches as well.

As indicated above and as will be described, the invention affords an explainer process and system that operates with a machine learning process to identify the importance (significance) of various features or attributes of a target observation to an outcome result made by that machine learning process. The invention may operate with an ensemble prediction process 20, for example, such as a Random Forest ensemble prediction process, as shown in FIG. 2 to identify the reasons for a prediction made by the process. Identifying the reasons for an outcome or prediction is important to an understanding of the bases for the outcome and to enable follow-on utilization of the outcome or prediction.

As will be described, a first step in an explainer process in accordance with the invention to explain the reasons for a specific classification or prediction is to determine the similarity between each training observation and the target observation. This is done by comparing the specific descriptive features of the training observations with the features of the target observation for which a prediction or classification is desired for similarities to build a predictive model. Building the model may include determining similarity distances between the target observation for which the specific outcome or prediction that was made and the training observations in a sample from the training dataset. A small distance indicates training observations close to or similar to the target observation. A distance metric may be developed by first measuring distances between features. Different distance measuring metrics may be used for different ensemble learning algorithms, but for a Random Forest algorithm, a geodesic distance may first be determined. Geodesic distance is defined as the distance in a decision tree from a leaf (end node) of the target observation to the last node (split node) that the target observation has in common with a training observation to which it is being compared. The geodesic distance relates to the number of edges between the leaf and the split node.

Geodesic distance may be illustrated by reference to the decision tree of FIG. 1 B. The geodesic distance, d, between Mon and Tue is 0, since they are at the same end node (leaf). The geodesic distance between Mon and Thu is 1 because there is one edge to their split node "Humidity", and the distance between Mon and Wed is 2 because there are 2 edges to their split node "Outlook". The depth (N) of the decision tree branch is the number of nodes from the top (root) to the leaf containing the target observation. For the tree of FIG. 1B, N=2 for the branch with Outlook ="Overcast" and N=3 for all other branches. The index (I) of a split node, such as the node "Humidity" of FIG. 1B, is I=N+1−d. These relationship definitions will be used below in connection with describing an embodiment of the invention.

Figure 3:
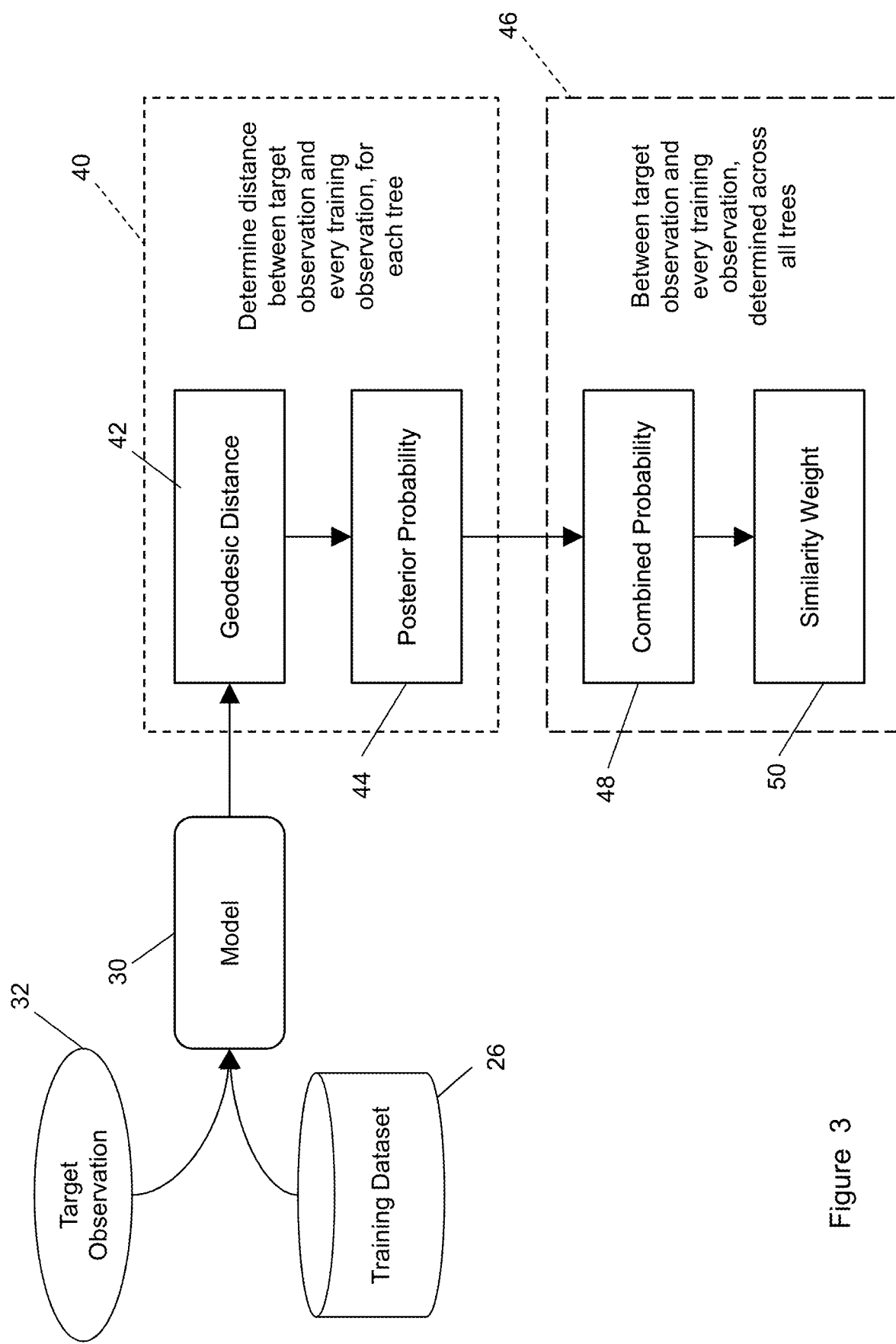
FIG. 3 is a functional block diagram of an overview of a portion of a prediction explainer process in accordance with the invention.
Figure 4:
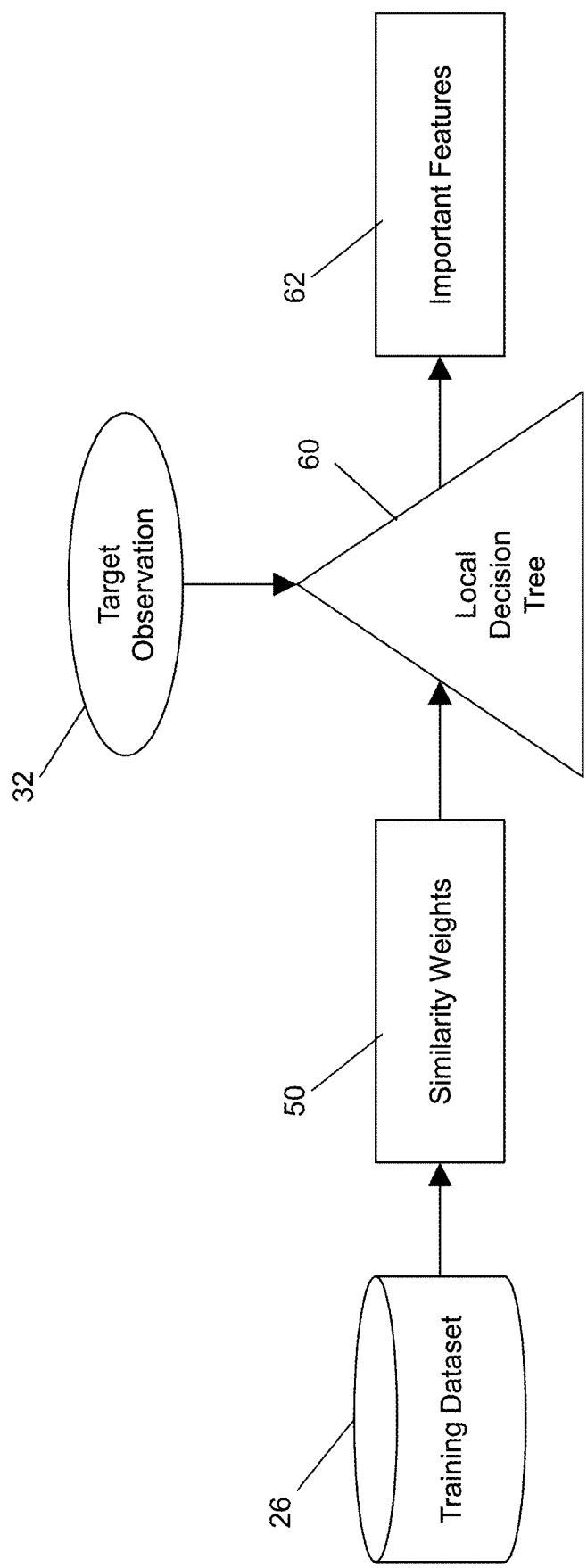
FIG. 4 is functional block diagram of an overview of another portion of a prediction explainer process in accordance with the invention.

FIGS. 3 and 4 are functional block diagrams that give an overview of an embodiment of an explainer process in accordance with the invention. Referring to FIG. 3, training observations from the training dataset 26 and a target observation 32 may be processed by a model 30 to determine similarity for each observation, as measured by a similarity weight. In a preferred embodiment, the model may be developed using a particular type of Random Forest known as a Mondrian Forest, which is described, e.g., in Lakshminarayanan, Balaji, Roy, Daniel M., and Teh, Yee Whye, "*Mondrian Forest: Efficient Online Random Forest*", *Advances in Neural Information Processing Systems (NIPS)* (2014), available at http://www.gatsby.ucl.ac.uk/~balaji/mondrian_forests_nips14.pdf. The model development described below is specific to a Mondrian type of Random Forest model. It will be appreciated, however, that similar approaches may be employed for developing models for other types of Random Forest processes.

A simple interpretation and equation for determining the distance between observations, which is related to similarity can be developed from the above-referenced Lakshminarayanan, et al., publication. In a first part 40 of the process, for each decision tree in the Mondrian Random Forest, the geodesic distance between the target observation and every training observation is determined at 42, and at 44 a posterior probability, $P_T(F|I,N)$, for that tree may be estimated using a simplified form of a hierarchical Bayesian model in the following:

$$P_T(F \mid I, N) = \frac{1}{C} \sum_{K=1}^{N} P(K \mid N, F) P(I \mid N, K) = \qquad \text{Eq. 1}$$

$$\frac{1}{C} \sum_{K=1}^{N} \left\{ \binom{N}{K} F^K (1-F)^{N-K} \left[ \prod_{J=1}^{I-1} \left(1 - \frac{K}{N-(J-1)}\right) \right] \frac{K}{N-(I-1)} \right\}$$

where F is the probability that the target observation and the observation to which it is compared are on opposite sides of a new split node created by the Mondarian Random Forest process. The value I is the index of the split node and C is a normalization constant. Stated another way, the posterior probability is the probability that the target observation and a training observation end up on opposite sides of the new split node. If the two observations are at the same leaf (end node) of the tree, their distance d=0. In a next part 46 of the process, the combined posterior probability 48 and a similarity weight 50 are determined between the target observation and every training observation, and combined across all trees. Combining the posterior probabilities 48 for each tree yields a final inference of the distance between a target observation and a training observation m as defined by the following:

$$E_m = \sum_F F \left[ \frac{\prod_T P_T(F \mid I, N)}{\sum_F \prod_T P_T(F \mid I, N)} \right] \qquad \text{Eq. 2}$$

Next, the distances across all M training observations may be scaled by a concentration factor, r, that determines the concentration or fraction (proportion) of training observations nearest to the target observation that contain the most weight. Since the distances are not normalized, and will change if the number of trees in the Random Forest changes, the concentration factor, r, effectively normalizes the distances since it selects a given proportion of the total observations. The concentration factor, r, may be selected to focus on the closest (most similar) training observations to the target observation. It defines the local environment comprising the target observation and the closest (surrounding) training observations to the target observation. The higher the value selected for r, the larger the number of training observations that are included. In an embodiment, a value of r of 5% was found to give good results and is preferred. Once r is defined, the similarity weights, $w_m$, for the training observations may be determined. This begins by solving the following equation:

$$r = \frac{1}{M} \sum_{m=1}^{M} e^{-wE_m} \qquad \text{Eq. 3}$$

for a scalar, w. Next, the similarity weight, $w_m$, for each observation, m, may be determined at 50 (FIG. 3) from the exponential similarity function: Eq. 4:

$$w_m = e^{-wE_m}$$

FIG. 4 is an overview of a portion of the explainer process. To explain why a prediction (classification) was made, the invention seeks to determine the set of training observations that have features similar to the target observation. The closer a training observation is to the target observation, the higher is the similarity weight. Predictions are based primarily upon similar observations. An explanation for a prediction may be based upon the significance of the features that contributed to the prediction.

The explainer process of FIG. 4 builds a local model using primarily the training observations closest to the target observation. This may be done by fitting a single decision tree 60 to a sample of the training observations 26 weighted by the similarity weights derived as described above, and by applying the local model to the target observation 32. The similarity weights emphasis training observations of the sample that are near to the target observation and represent reasonable alternatives to the target observation. Therefore, the local model generalizes the main characteristics (features) of the target observation that were responsible for the specific prediction produced by the ensemble process. At 62, the significance or importance of each feature to the specific prediction is determined. As described below, the importance of a feature to a prediction may be determined by observing the increase in variance (impurity) that results when that feature is excluded from the tree. The higher the variance, the greater the significance of that feature is to the prediction. Features may be ranked as to significance based upon associated variance values.

Figure 5:
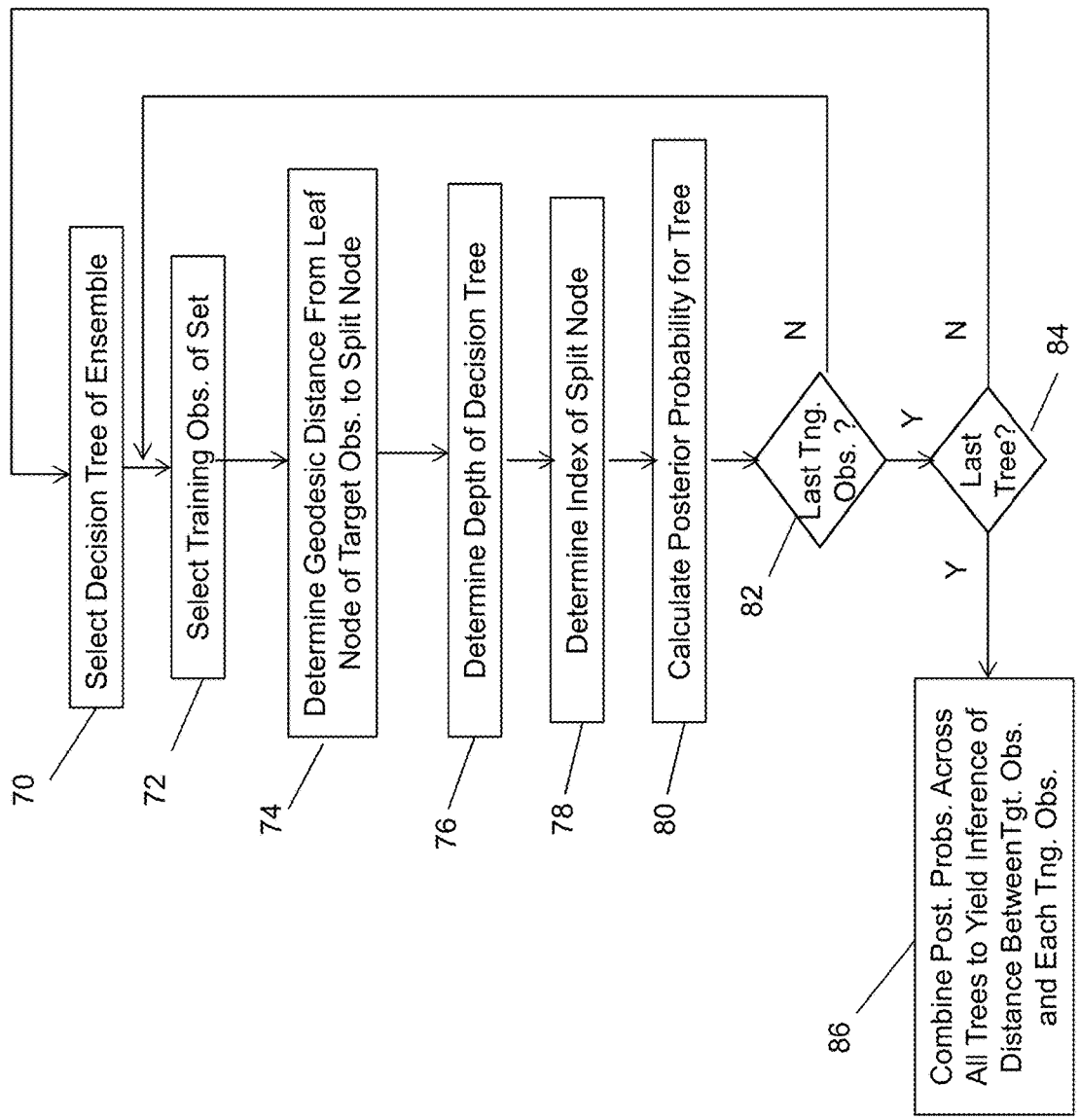
FIG. 5 is a flowchart illustrating a workflow process of FIG. 3.
Figure 6:
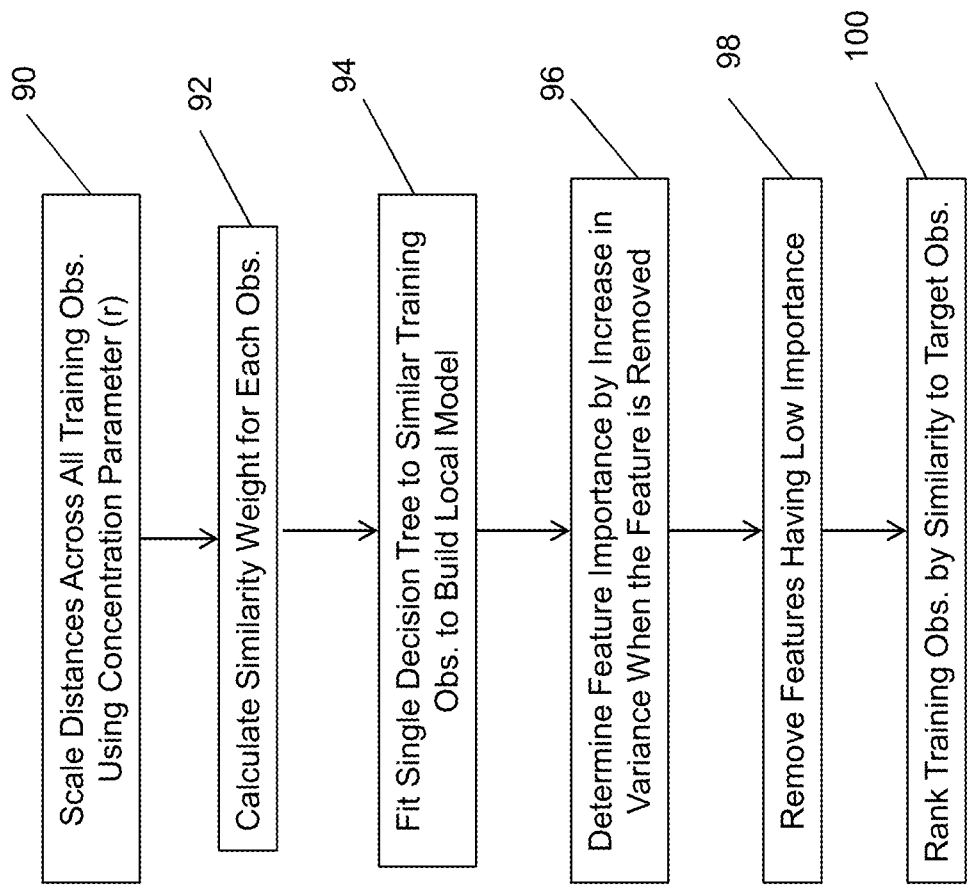
FIG. 6 is a flowchart illustrating a workflow process of FIG. 4.

FIGS. 5 and 6 are workflow diagrams that illustrate in more detail the processes shown in FIGS. 3 and 4. FIG. 5 illustrates recursive workflow processes of step 40 and 46 of FIG. 3 that determine a measure of similarity between a target observation and each training observation in every decision tree. FIG. 6 illustrates in more detail workflow processes 60 and 62 of FIG. 4.

Referring to FIG. 5, at step 70 a decision tree of the Random Forest ensemble may be selected, and at 72 a training observation of the set of training observations may be selected. At 74, the geodesic distance may be determined from a leaf node of the target observation to the last node in common with the selected training observation (leaf node) as determined by the edges between the nodes, as previously described. At 76, the depth N of the selected decision tree may be determined. At 78, the index of the split node is determined; and at 80, the posterior probability of the selected decision tree may be calculated using Eq. 1 as previously described. At 82, if there are any remaining unprocessed training observations of the set, the process returns to step 72 and repeats for the next training observation. If, however, at 82 all training observations have been processed, at step 84 it is determined whether any decision trees remain unprocessed. If so, the process returns to step 70 and the foregoing process steps of FIG. 5 repeat. This continues until there are no remaining unprocessed decision trees. At 86, the posterior probabilities of the decision trees may be combined to obtain a final inference of the distances between the target observation and each training observation.

Having determined at 86 a final inference of the distances, the process may move to the workflow shown in FIG. 6. FIG. 6 is a workflow diagram that illustrates in more detail step 60 of FIG. 4 which builds a local model that leads to the prediction and step 62 of FIG. 4 that identifies the significance of the features that resulted in that prediction.

Referring to FIG. 6, at step 90, the local environment may next be defined by scaling the distances across all training observations in the set using the concentration factor, r, (Eq. 3) to select as a set of local training observations a fraction of the total training observations that are closest to the target observation. At 92, similarity weights may be calculated using Eq. 4 for the local training observations. Similarity weights represent the similarities between training observations and the target observation. They favor training observations that are near to a target observation and represent reasonable alternatives to the target observation. At 94 a single decision tree may be fitted to the local training observations (as described at 60, FIG. 4) so as to minimize the impurity of leaf nodes and afford the best separation between classes (e.g., classifications such as "bad" or "good"). This may be done using any of several well-known iterative algorithms for fitting decision trees to data. For instance, if features have categorical values (e.g., "Yes" or "No"), the objective is to find the fit of a tree to the observations that results in the maximum separation between "Yes" and "No" on different sides of a node. The best fit is preferably one that results in homogeneity of "Yes" and "No" on opposite sides of a node.

To determine the importance of features to the prediction or classification made by the decision tree, a repetitive step is performed at 96 for each feature in turn, where a feature is selected, removed from the tree, and the variance is calculated, as described above. At 98, features resulting in low variance and, hence, having low importance may be removed from the tree, and the remaining features may be normalized and ranked at 100 by similarity to the target observation. The ranking order indicates the relative importance of the features to the predicted result, and explains the reasons for the prediction. Accordingly, the ranking may be presented to an analyst or otherwise used in follow-on processes and operations.

Figure 7:
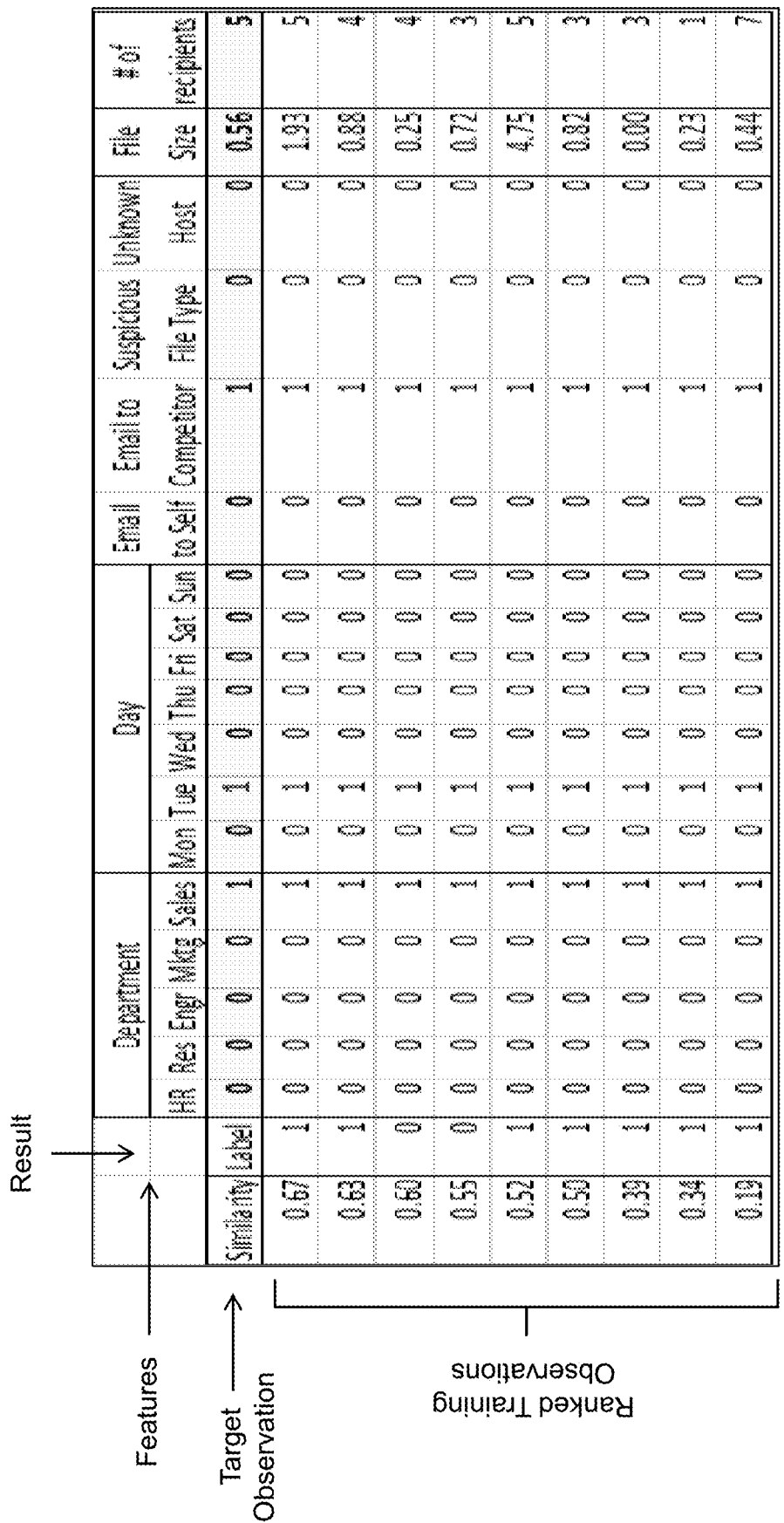
FIG. 7 is a table that illustrates the results of a prediction explainer process in accordance with the invention in the context of a cybersecurity application.

An embodiment of the foregoing process will be illustrated in connection with a cybersecurity application in an enterprise, such as a sales organization, to detect suspicious, malicious or unauthorized emails. A set of training observations comprising a multitude of emails having a variety of features was analyzed using a Random Forest ensemble prediction algorithm to build a prediction model. Some of the training observations were determined to be and labeled as suspicious and some were not. A target email was analyzed, and the Random Forest algorithm predicted a 0.82 probability that the target email was suspicious. FIG. 7 is a table that illustrates the results of an explainer process in accordance with the invention to explain the reasons for the prediction. The table ranks the nine closest training observations having the greatest similarity weights ($w_M$) to the target email (in the top row) shown in descending order (the first column "Similarity" indicates the similarity weight values), and shows the set of features considered and their corresponding values for each email observation. The features include the organization's sending department ("HR", "Res", "Engr" and "Sales"), the day of the week ("Mon"-"Sun"), whether the email was to the sender's personal address ("Self"), to a Competitor, whether the file type was a suspicious one, whether the host was known, the file size, and the number of recipients. "Label" is the determination (classification) that an email was suspicious or not. Categorical feature values of "1"=true and "0"=false. Other values are continuous numerical values.

Figure 8:
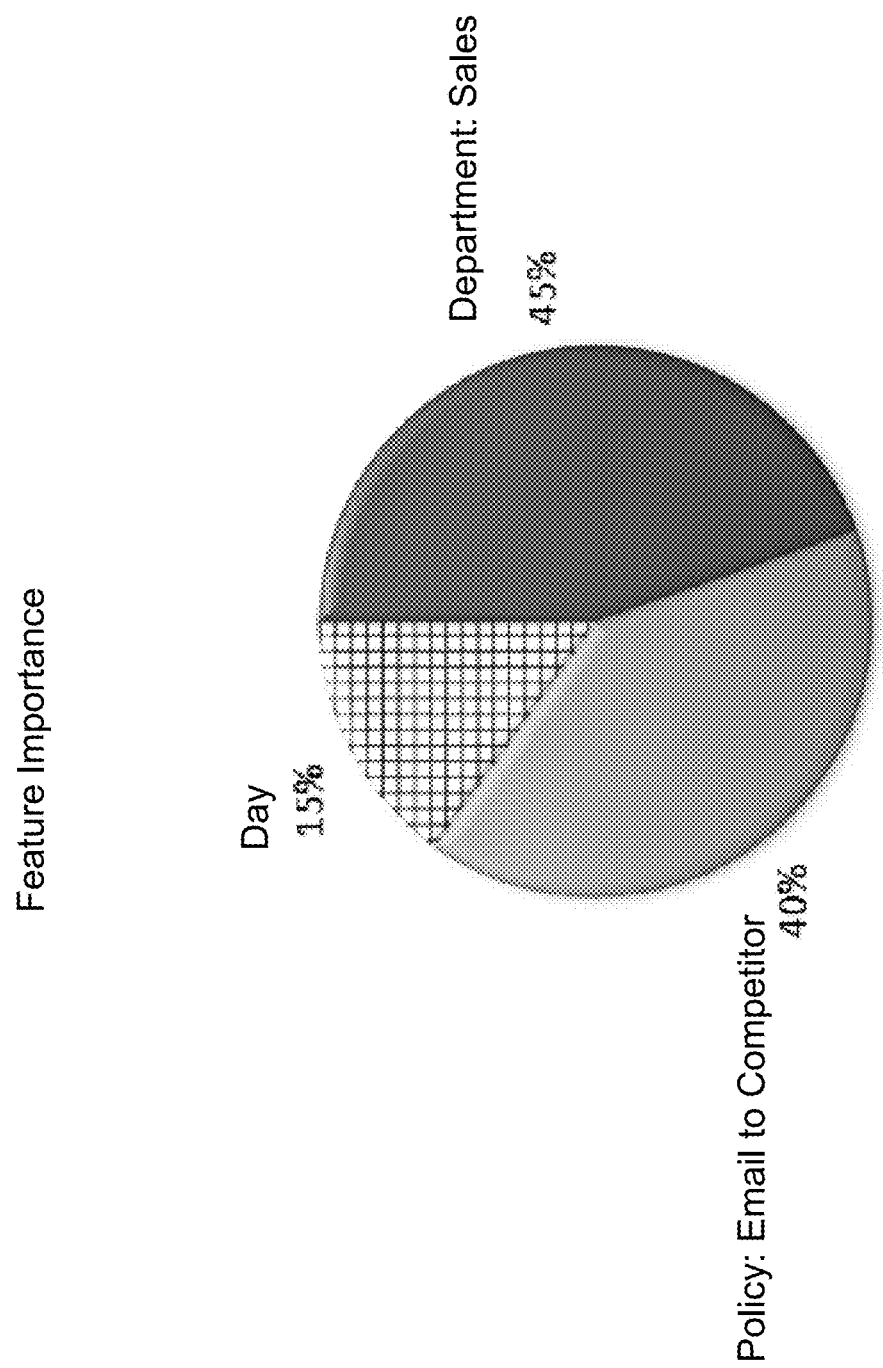
FIG. 8 is a diagrammatic view illustrating the relative importance of features in the table of FIG. 7 that were critical to the prediction made by the classifier method of the invention.

From the table, it can be seen from the values "1" that the Sales Department emailing a Competitor on Tuesday are email features that raise concern, although not all such emails were identified (labeled) as being suspicious. This could be either because of an error of an analyst who labeled the email in the training dataset or the result of a feature not included in the classifier. Nevertheless, the explainer process in accordance with the invention produced a simple, concise explanation, as shown in FIG. 8, which is consistent with the features that define the similar observations, as well as the value predicted by the ensemble classifier. FIG. 8 illustrates diagrammatically the relative importance of the features (Department: Sales: Policy: Email to Competitor; and Day: Tue.) that were critical to the prediction. The Random Forest process predicted a probability of 0.82 that the target email was suspicious, which is consistent with the fact that eight of the ten rows (80%) of the table labeled corresponding emails as suspicious.

The advantages of the invention in enabling explanation of a prediction in a complex process in terms of a few critical features out of potentially hundreds of features analyzed by an ensemble machine learning process are apparent. The invention allows focusing on the fundamentals of underlying phenomena while ignoring noise and irrelevant characteristics.

While the foregoing has been with reference to a preferred embodiment, it will be appreciated that changes to this embodiment may be made without departing from the principles of the invention, the scope of which is defined by the appended claims.

The invention claimed is:

1. A method of explaining the reasons for a prediction made by an machine learning ensemble prediction process as to the probability of an outcome for a target observation, the prediction process having been trained on a plurality of training observations of a training dataset, said target observation and said training observations being characterized by a plurality of features, each feature having a feature value, comprising:
   determining similarity between the target observation and each training observation of a set of said training observations;
   selecting a subset of said training observations comprising a fraction of said training observations that are most similar to said target observation;
   ranking the training observations of said subset by similarity of each such training observation to said target observation; and
   determining a significance of the features of said ranked training observations that contributed to said prediction.

2. The method of claim 1, wherein said determining said similarity comprises determining closeness between the target observation and each training observation.

3. The method of claim 2, wherein determining said closeness comprises determining a geodesic distance between said target observation and a training observation of said subset.

4. The method of claim 2, wherein said ensemble prediction process produces a probability of a prediction by combining a plurality of predictions made by a plurality of prediction models of said ensemble prediction process, and said determining said closeness comprises determining a posterior probability for a feature of said target observation relative to a feature of a training observation.

5. The method of claim 4, wherein said ensemble prediction process comprises a type of Random Forest ensemble process, and said posterior probability comprises the likelihood that said target observation and said training observation are on opposite sides of a split node created by said type of Random Forest ensemble process.

6. The method of claim 1, wherein said determining said similarity comprises determining a similarity weight for each training observation, said similarity weight measuring closeness of each training observation to said target observation.

7. The method of claim 6, wherein said method further comprises building a local model by fitting a decision tree the training observations of said subset using said similarity weights.

8. The method of claim 6, wherein said ranking comprises ranking said training observations of said subset relative to said target observation by similarity weight and to afford separations between classes.

9. The method of claim 1, wherein said determining the significance of features to said prediction comprises fitting a local model to a second set of weighted training observations to afford a best separation between classes, removing each feature, in turn, from the local model, and determining an increase in variance in the local model upon removing each feature.

10. The method of claim 9 further comprising ordering said features by said increase in variance upon a feature being removed to indicate significance of said feature to said prediction.

11. A computer product comprising a non-transitory computer readable medium storing executable instructions for controlling the operations of a computer to perform a method of explaining the reasons for a prediction made by an machine learning ensemble prediction process as to the probability of an outcome predicted by said prediction process for a target observation, the prediction process having been trained on a plurality of training observations of a training dataset, said target observation and said training observations being characterized by a plurality of features, each feature having a feature value, the method comprising:
   determining similarity between the target observation and each training observation of a set of said training observations;
   selecting a subset of said training observations comprising a fraction of said training observations that are most similar to said target observation;

ranking the training observations of said subset by similarity of each such training observation to said target observation; and determining a significance of the features of said ranked training observations that contributed to said prediction.

12. The computer product of claim 11, wherein said determining said similarity comprises determining closeness between the target observation and each training observation.

13. The computer product of claim 12, wherein determining said closeness comprises determining a geodesic distance between said target observation and a training observation of said subset.

14. The computer product of claim 12, wherein said ensemble prediction process produces a prediction by combining a plurality of predictions made by a plurality of prediction models of said ensemble prediction process, and said determining said closeness comprises determining a posterior probability for said target observation relative to a training observation.

15. The computer product of claim 14, wherein said ensemble prediction process comprises a type of Random Forest ensemble process, and said posterior probability comprises the likelihood that said target observation and said training observation are on opposite sides of a split node created by said type of Random Forest ensemble process.

16. The computer product of claim 11, wherein said determining said similarity comprises determining a similarity weight for each training observation, said similarity weight measuring closeness of each training observation to said target observation.

17. The computer product of claim 16, wherein said method further comprises building a local model by fitting a decision tree to said subset of the training observations using said similarity weights.

18. The computer product of claim 16, wherein said ranking comprises ranking said training observations of said subset relative to said target observation by similarity weight and to afford separations between classes.

19. The computer product of claim 11, wherein said determining the significance of features to said prediction comprises fitting a local prediction model to a second set of weighted training observations to afford a best separation between classes, removing each feature, in turn, from the local model, and determining an increase in variance in the local model upon removing each feature.

20. The computer product of claim 19 further comprising ordering said features by said increase in variance upon a feature being removed to indicate significance of said feature to said prediction.

* * * * *